(12) United States Patent
Stakoe et al.

(10) Patent No.: US 8,651,715 B2
(45) Date of Patent: *Feb. 18, 2014

(54) VEHICLE VANITY AND LIGHT ASSEMBLY

(71) Applicant: Ford Global Technologies, LLC, Dearborn, MI (US)

(72) Inventors: John Andrew Stakoe, Bloomfield Hills, MI (US); Chi Li, Sioux Falls, SD (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,530

(22) Filed: Mar. 26, 2013

(65) Prior Publication Data

US 2013/0208492 A1    Aug. 15, 2013

Related U.S. Application Data

(62) Division of application No. 12/796,996, filed on Jun. 9, 2010, now Pat. No. 8,425,094.

(51) Int. Cl.
*B60Q 3/02*    (2006.01)

(52) U.S. Cl.
USPC ............................ 362/492; 362/135; 362/142

(58) Field of Classification Search
USPC ......... 362/490, 492, 137, 142; 296/97.1, 97.5
See application file for complete search history.

(56) References Cited

U.S. PATENT DOCUMENTS

| | | | |
|---|---|---|---|
| 3,375,364 A * | 3/1968 | Marcus | ......................... 362/144 |
| 4,511,954 A | 4/1985 | Marcus et al. | |
| 4,807,093 A | 2/1989 | Cisler | |
| 4,947,296 A | 8/1990 | Takeuchi et al. | |
| 5,174,644 A | 12/1992 | Hermansson et al. | |
| 5,283,720 A | 2/1994 | Boerema et al. | |
| 5,564,813 A | 10/1996 | Curtindale | |
| 6,435,593 B2 | 8/2002 | Welter | |
| 7,128,451 B2 | 10/2006 | Kaphengst et al. | |
| 7,217,017 B2 | 5/2007 | Smith | |
| 7,261,450 B2 | 8/2007 | Tiesler | |
| 8,038,331 B2 | 10/2011 | Kino et al. | |
| 2011/0019391 A1 | 1/2011 | Welter | |

* cited by examiner

*Primary Examiner* — Peggy A. Neils
(74) *Attorney, Agent, or Firm* — Vichit Chea; Price Heneveld LLP (57) ABSTRACT

A vehicle sun visor is provided that includes a visor body having a first side and a second side, and a vanity and lighting assembly located on the visor body. The assembly includes a lighting device located on the visor body. The lighting device is configured to provide a vanity light for a vanity mirror and is further configured to provide a dome light.

14 Claims, 11 Drawing Sheets

VEHICLE VANITY AND LIGHT ASSEMBLY

CROSS-REFERENCE TO RELATED APPLICATION

This application is a divisional of U.S. patent application Ser. No. 12/796,996, filed on Jun. 9, 2010, now U.S. Pat. No. 8,425,094, entitled "VEHICLE VANITY AND LIGHT ASSEMBLY AND VISOR HAVING VANITY AND DOME LIGHTING." The aforementioned related application is hereby incorporated by reference.

FIELD OF THE INVENTION

The present invention generally relates to automotive lighting in a vehicle, and more particularly relates to a vehicle vanity assembly equipped with lighting.

BACKGROUND OF THE INVENTION

Automotive vehicles are typically equipped with one or more dome lights which are turned on when the vehicle door is opened or unlocked for ingress and egress within the vehicle or otherwise turned on by a passenger to provide lighting on demand. Automotive vehicles are also equipped with a pair of sun visors generally located forward of the driver and front passenger, each of which are actuatable between stowed and use positions to provide shade from sunlight. Conventional visors typically include a vanity mirror assembly installed on one side of the visor body. The vanity mirror assembly typically has a mirror and one or more lights to provide local lighting sufficient to enable a user to view an image, particularly when ambient lighting conditions are poor. The vanity mirror light is activated on typically only when the visor is in the use position and a lid of the vanity mirror is opened or uncovered.

SUMMARY OF THE INVENTION

According to one aspect of the present invention, a vehicle visor is provided that includes a visor body having a first side and a second side, and a vanity mirror assembly located on the first side of the visor body. The visor also includes a lighting device assembly located on the visor body. The lighting device is configured to provide a vanity light and is further configured to provide a dome light.

According to another aspect of the present invention, a vehicle visor is provided that includes a visor body having a first side and a second side, and a vanity mirror assembly located on the first side of the visor body. The vanity mirror assembly comprises a mirror, a vanity lid, and at least one vanity lighting area. The visor also includes a lighting device assembly located on the visor body and configured to provide a light source for illuminating the vanity lighting area on the first side of the visor body and further configured to provide a dome light on the second side of the body. Actuation of the vanity lid to an uncovered position exposes the vanity lighting area and actuates a light shield to shield illumination on the second side of the visor body when the vanity lid is in the uncovered position.

According to yet another aspect of the present invention, a vehicle visor is provided that includes a visor body having a first side and a second side, and a vanity mirror assembly located on the first side of the visor body. The visor also includes a lighting device assembly located on the visor body and configured to provide a vanity light for the vanity mirror and further configured to provide a dome light. The visor further includes a rotating light shield located on the visor body so as to cover the dome light when the visor is in a downward use position and rotatable to expose the dome light when the visor is pivoted to an upward stowed position.

According to a further aspect of the present invention, a vehicle visor is provided that includes a visor body having a first side and a second side, and a vanity mirror assembly located on the first side of the visor. The visor also includes a lighting device assembly comprising one or more light sources mounted onto a supporting circuit board that rotates between first and second positions. The visor further includes a rotating mechanism for rotating the lighting device assembly between the first position which aligns the one or more light sources with the first side of the visor body to serve as a vanity light for the vanity mirror and a second position which aligns the one or more light sources with the second side of the visor body to serve as a dome light.

According to a further aspect of the present invention, a vehicle visor is provided that includes a visor body having a first side and a second side and a vanity mirror assembly located on the first side of the visor body. The visor further includes a lighting device assembly located on the visor body and comprising at least a first light source oriented on the first side to provide a vanity light for the vanity mirror and at least a second light source oriented on the second side to provide a dome light.

According to yet a further aspect of the present invention, a vehicle visor is provided that includes a visor body having a first side and a second side and a peripheral side extending between the first side and the second side and a vanity mirror assembly located on the first side of the visor body. The visor further includes a lighting device assembly comprising a light source located on the visor body and configured to provide a vanity light for the vanity mirror on the first side and a dome light provided on the peripheral edge side, wherein the light source directs light towards the first side for the vanity light and towards the peripheral edge side for the dome light.

According to yet a further aspect of the present invention, a vehicle vanity and lighting assembly is provided that includes a body having a first side and a second side and a vanity mirror located on the first side of the body. The vehicle vanity and lighting further includes a lighting device assembly located on the body and configured to provide a vanity light and further configured to provide a dome light.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 3:
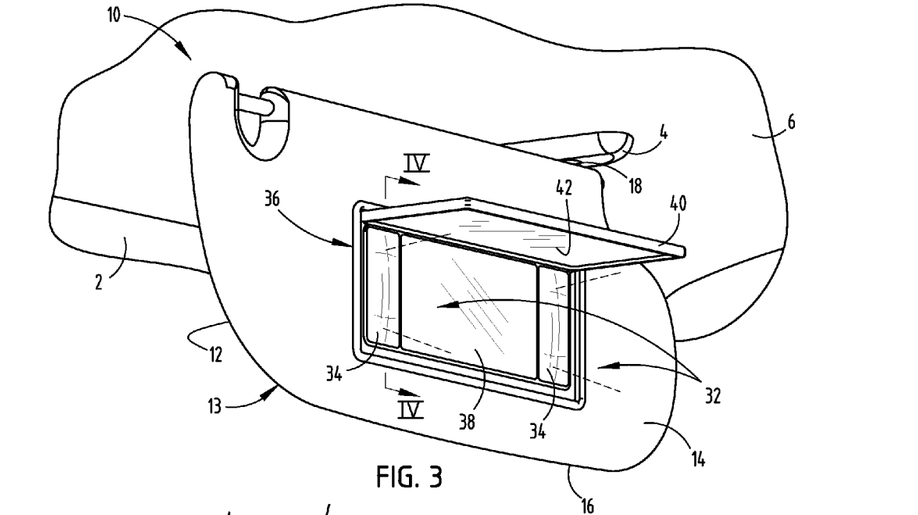
FIG. 3 is a perspective view of the visor in the use position with the vanity lid uncovered such that the lighting assembly provides a pair of vanity lights.
Figure 9:
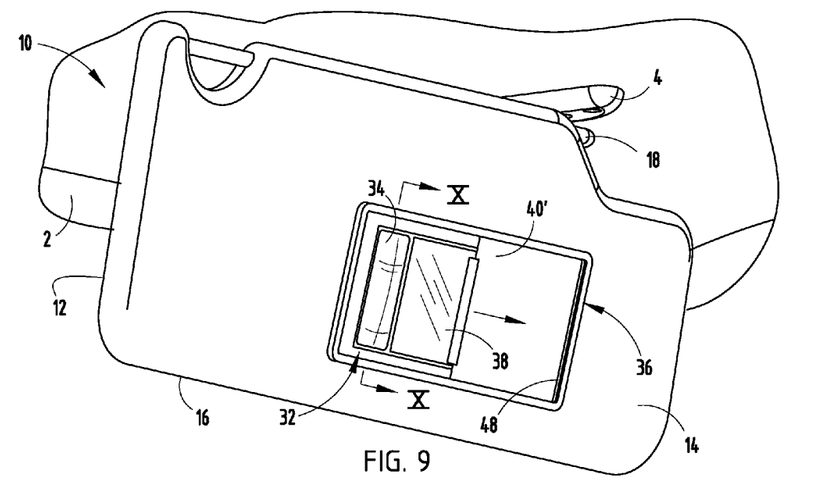
FIG. 9 is a perspective view of the sun visor of FIG. 7 in the use position having a sliding cover vanity mirror shown partially open.
Figure 22:
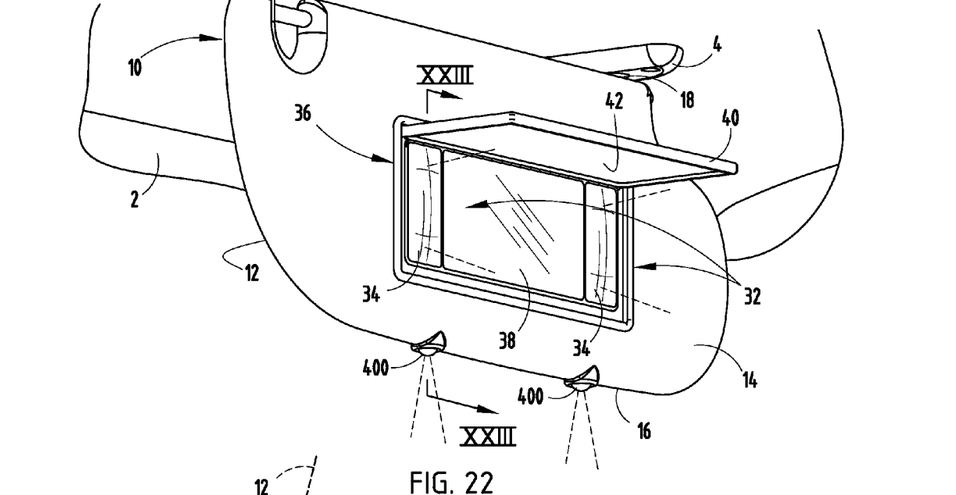
FIG. 22 is a perspective view of a visor showing the visor and vanity lid in the vanity use position having a dual function lighting assembly, according to a sixth embodiment.

For purposes of description herein, the terms "upper," "lower," "right," "left," "rear," "front," "vertical," "horizontal," and derivatives thereof shall relate to the visor and vanity and lighting assembly as oriented in FIGS. 3, 9 and 22. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
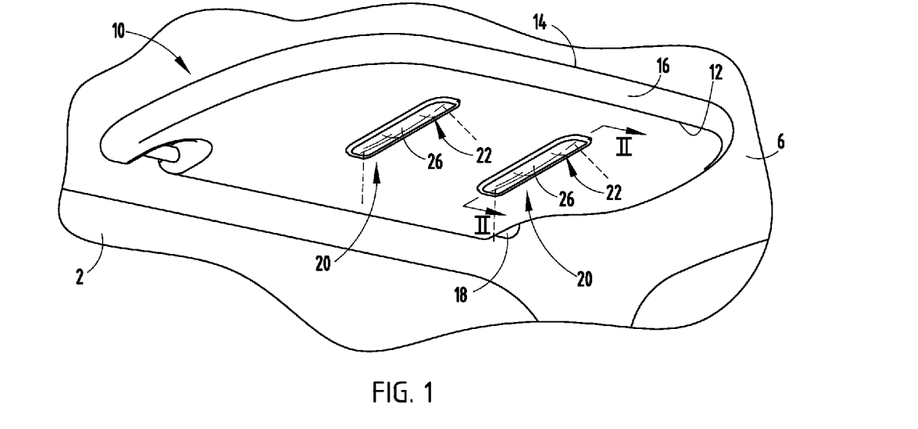
FIG. 1 is a perspective view of a sun visor in a stowed position in a vehicle and having a lighting assembly shown providing a pair of dome lights, according to a first embodiment.

Referring to FIGS. 1-6, a vehicle sun visor 10 is generally shown having a vanity and light assembly 26 providing dome lighting 20 on one side and vanity lighting 32 on the opposite side, according to a first embodiment. The vehicle sun visor 10 is shown installed in a vehicle 2 generally in a region forward of a front passenger seat of the vehicle 2. The visor 10 has a visor body 13 with a connector 18 that connects to a bracket 4 generally in the headliner 6 or roof of the vehicle 2. It should be appreciated that one or more sun visors 10 may be located at any of a number of locations on the vehicle and on any of a number of types of vehicles to provide sunshade in various positions including blocking light from the front windshield or from a side window which may be achieved by pivoting the visor body about connector 18. The sun visor 10 is designed to be tilted upright to a generally horizontal stowed position as shown in FIG. 1, or may pivot downward to a deployed use position as shown in FIG. 3.

The vehicle sun visor 10 includes a visor body having a conventional visor shape with a first or front side 14, a second or rear side 12 generally parallel to and opposite of first side 14, and a third side as the peripheral edge 16 connecting the first side 14 to the second side 12. The visor body may be made of conventional visor materials including, but not limited to, polyurethane and fabric. The connector 18 extends from the visor body and connects the visor 10 to the roof mount 4 and allows the visor body to be pivoted between the stowed and downward use positions of FIGS. 1 and 3 and also to be rotated ninety degrees (90°) from a position generally in front of the front windshield and a position generally in front of a side window of the vehicle 2.

Figure 2:
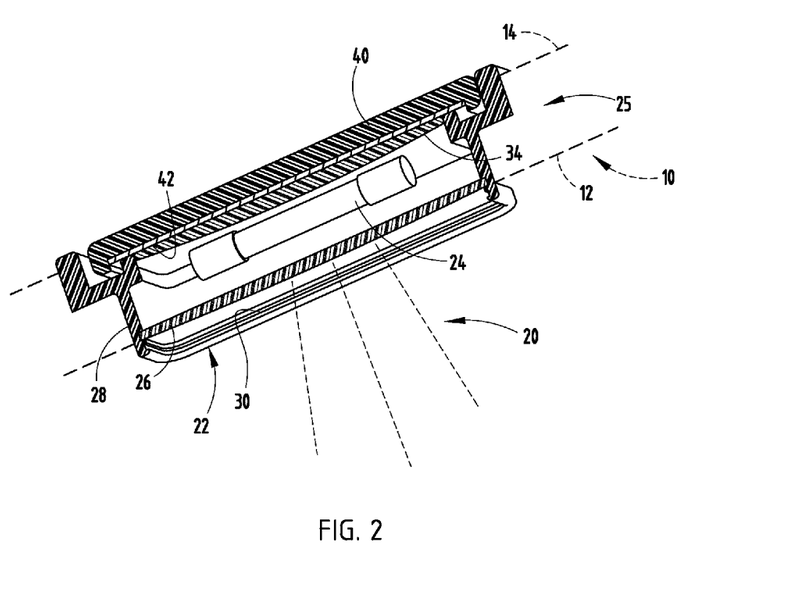
FIG. 2 is a cross-sectional view taken through line II-II of FIG. 1 further illustrating the lighting assembly.
Figure 4:
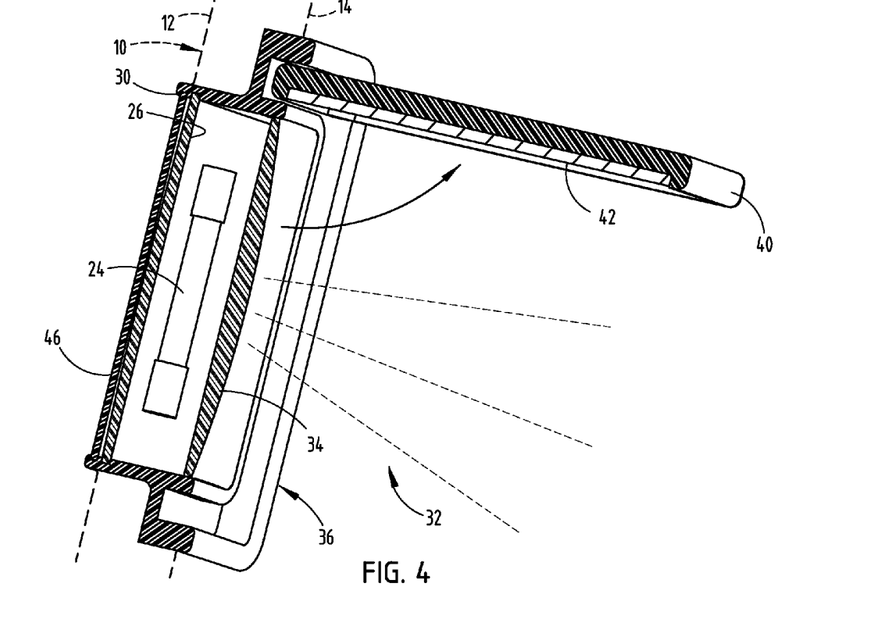
FIG. 4 is a cross-sectional view taken through line IV-IV of FIG. 3 further illustrating the lighting assembly.

The vehicle sun visor 10 has the vanity and lighting assembly 36 assembled therein such that a pair of dome lights 20 is located on the second side 12 of the visor body as seen in FIGS. 1 and 2. With visor 10 in the upward stowed position, the dome lights 20 serve to provide interior vehicle lighting similar to that provided by conventional dome lights which provide light illumination to the interior of the vehicle 2 when the vehicle door is opened, the vehicle is unlocked, or a user otherwise turns on the dome lights for interior lighting. The dome lights 20 could provide a courtesy function (lit up when a door is open/closed or turned on by a demand switch). The dome lights 20 may also be referred to as reading lights. The visor 10 and assembly 36 also include a vanity mirror assembly located on the first side of the visor body as seen in FIGS. 3 and 4. The vanity and lighting assembly 36 includes a vanity mirror 38 and vanity lights 32 on the first side for providing light illumination on opposite left and right sides of the mirror 38. The assembly 36 also includes a vanity lid 40 on the first side that pivots between a covered position which covers the mirror 38 and vanity lights 32 and an uncovered position which exposes the mirror 38 and vanity lights 32. The vanity lid 40 may be coupled to switch circuitry which turns the vanity lights 32 on when the vanity lid 40 is open and turns the vanity lights 32 off when the vanity lid 40 is closed. The vanity lights 32 provide light illumination to a passenger in the vehicle 2 when the vanity lid 40 is in the uncovered position. The visor 10 has a lighting device assembly included in the vanity and lighting assembly 36 with at least one light source 24 that advantageously provides lighting for both the dome lighting and vanity lighting. In the embodiment shown, two light sources 24 are provided, each providing light for one of the dome lights and one of the vanity lights.

The visor 10 is shown in the upward stowed position in FIGS. 1 and 2 with the lighting device assembly providing dome lighting 20 on the second side to passengers within the vehicle 2. The lighting device assembly is further shown in FIG. 2 having the lighting device 24, such as an incandescent bulb, serving as a light source for providing light illumination. The light source 24 is located within a housing 28 and is powered via electrical circuitry as should be evident to those skilled in the art. A first optical lens 26 is connected to housing 28 on the second side of the light source 24 for directing light illumination to the passenger compartment when functioning as a dome light 20. Located behind the lens 26 is a track 30 for receiving a light shield 46 that covers the second side of lens 26 when the lighting device 24 is employed as a vanity light 36 as shown in FIGS. 3 and 4.

The vanity lid 42 has a reflective surface 42 provided on the inner or front side thereof for reflecting light illumination towards the second side to enhance the illumination intensity of the dome light 20. As seen in FIG. 2, light from light source 24 may radiate outward as dome light 20 passing through lens 26. In addition, light illumination from light source 24 may pass through lens 34 and be reflected by reflective surface 42 in the opposite direction to add to the light illumination of dome light 20. Accordingly, the reflective surface 42 provides for an enhanced brightness dome light, as compared to the vanity lighting, according to one embodiment. The reflective surface 42 may include a layer of reflective material, such as aluminum, chrome or a mirror, applied as a separate layer, or other light reflecting materials.

Referring to FIGS. 3 and 4, the visor 10 is shown in the downward vanity use position with the vanity lid 40 in the uncovered position. In this position, the vanity mirror 38 is viewable by a passenger or user and is illuminated by first and second vanity lights 32 shown on opposite sides of mirror 38. Each of the vanity lights 32 share a common light assembly and light source with one of the dome lights 20 on the opposite sides of the visor 10, such that the light assembly provides both the dome light 20 and vanity light 32 on opposite sides of the visor body. As seen in FIG. 4, the light assembly includes a second lens 34 located on the first or front side of the light source 24 for directing light illumination toward the first side of the visor 10 to a user or passenger in the vehicle 2 positioned in front of the vanity mirror 38. In the vanity use position with the vanity lid 40 open, the light shield 46 covers the first lens 26 so as to block light illumination from the rear or second side 12 of the visor 10 such that light is blocked from passing forward towards the front of the vehicle when the visor 10 is deployed in the downward use position.

Figure 5A:
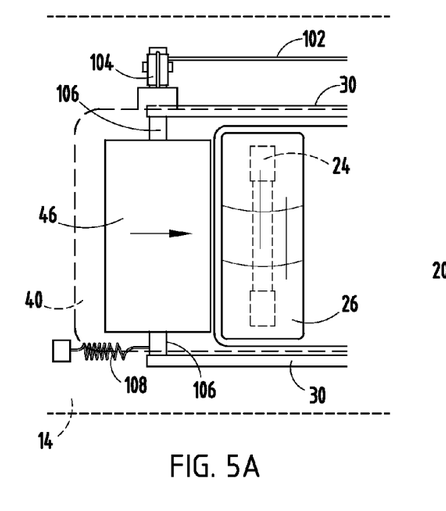
FIG. 5A is a rear view of a portion of the shield and slide assembly employed in the visor of FIG. 1 with the vanity lid open, according to one embodiment.
Figure 5B:
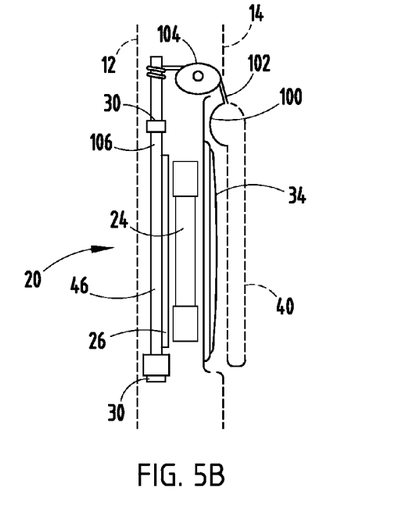
FIG. 5B is a side view of a portion of the slide assembly for actuating the shield shown in FIG. 5A with the vanity lid closed.
Figure 6A:
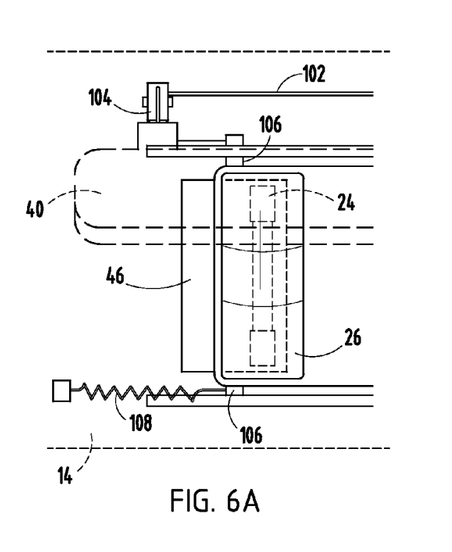
FIG. 6A is a rear view of a portion of the shield and slide assembly employed in the visor of FIG. 1 with the vanity lid open, according to one embodiment.
Figure 6B:
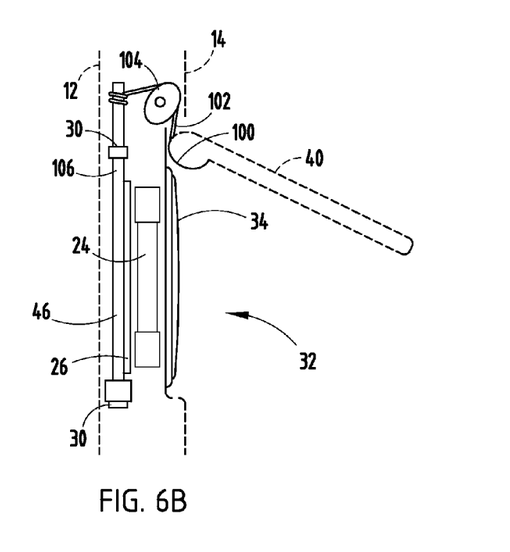
FIG. 6B is a side view of a portion of the slide assembly for actuating the shield shown in FIG. 6A with the vanity lid closed.

Movement of the vanity lid 40 between the covered (closed) to the uncovered (open) position activates a switch to apply power to the light source 24 and also actuates movement of the light shield 46 within track 30 by employing a moving shield assembly as shown in FIGS. 5A-6B. Referring to FIG. 5A, the light shield 46 is shown engaged via arms 106 to track 30 such that the light shield 46 slides within track 30 between the uncovered position in FIG. 5A and the covered position shown in FIG. 6A. Attached to one of arms 106 is a cable 102 or other flexible link which is coupled to the vanity lid 40 via pulley 104 and cam surface 100 of pivoting lid 40. When the vanity lid 40 is pivoted or rotated from the closed position shown in FIG. 5B to an open position as shown in FIG. 6B, the cable 102 is pulled along cam surface 102 so as to pull the light shield 46 along track 30 from the closed position to a position that covers optical lens 26 and light source 24 on the rear side of the visor 10. In this position, the light shield 46 prevents light illumination from exiting the rear side 12 of the visor 10 which would otherwise pass forward of the vehicle with the visor in the downward position and the lights turned on. When the vanity lid 40 is rotated back to the closed position as shown in FIG. 5B, a spring 108 fixedly connected to a structure of the visor on one end and one of arms 106 on the opposite end pulls the light shield 46 in the opposite direction from the covered position shown in FIG. 6A to the uncovered position shown in FIG. 5A. Accordingly, actuation of the vanity lid 40 electrically turns the light source 24 on or off and causes movement of the light shield 46 between covered and uncovered positions on the rear side of the assembly 36 and visor 10.

Figure 7:
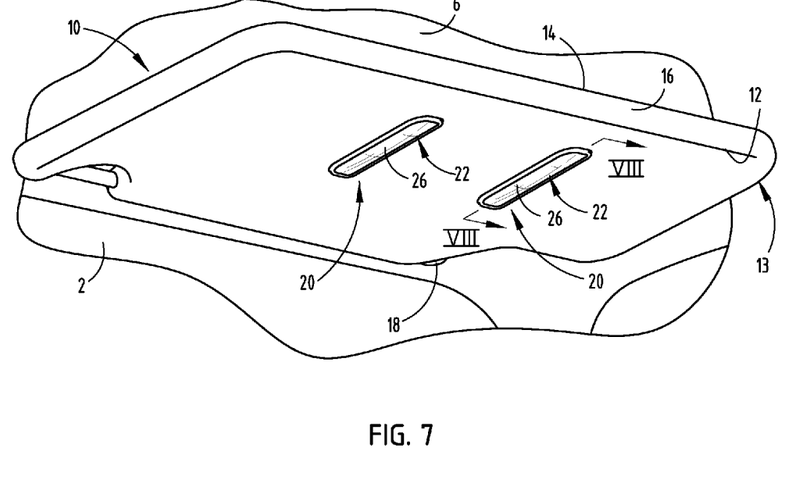
FIG. 7 is a perspective view of a sun visor having a lighting assembly, according to a second embodiment.
Figure 8:
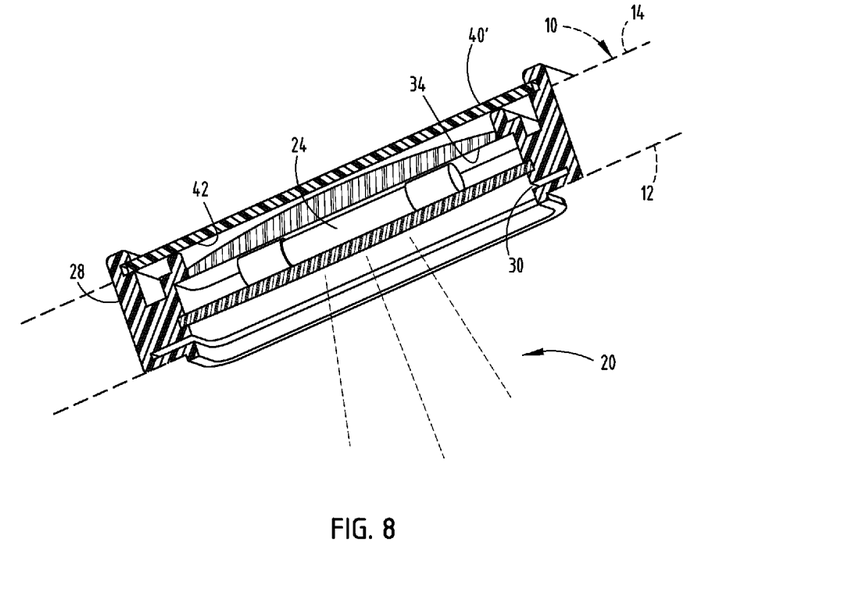
FIG. 8 is a cross-sectional view taken through line VIII-VIII of FIG. 7 further illustrating the lighting assembly.
Figure 10:
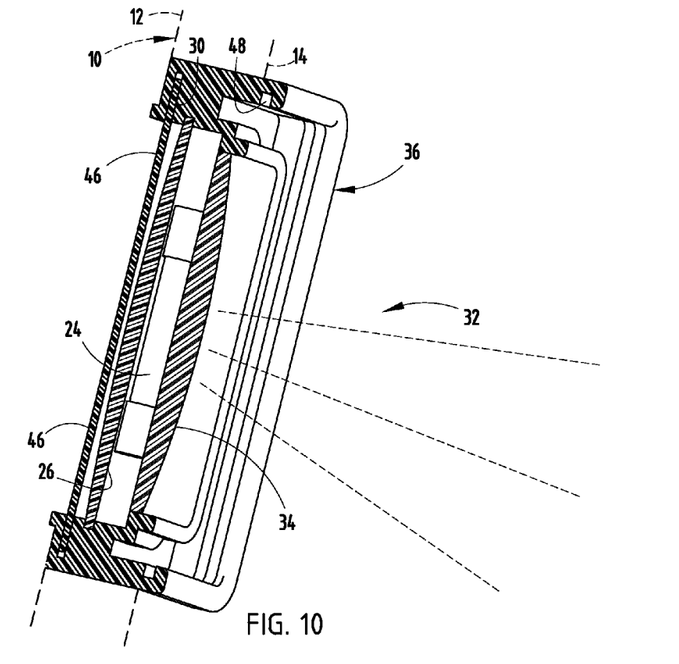
FIG. 10 is a cross-sectional view taken through line X-X of FIG. 9 further illustrating the lighting assembly.

Referring to FIGS. 7-11, a vehicle sun visor 10 is generally shown employing a vanity and light assembly 36 with a vanity lid 40' that slides, according to a second embodiment. The vehicle sun visor 10 shown and described in this embodiment is similar to the visor 10 shown in FIGS. 1-6, with the exception that vanity and light assembly employs the sliding vanity lid 40' which slides within track 48 and is cooperatively engaged with the light shield 46. In this embodiment, the visor 10 has a pair of dome lights 20 provided on the rear side 12 as seen in FIGS. 7 and 8 when the visor 10 is in the upward stowed position. When the visor 10 is deployed to a downward vanity useable position, such that the vanity mirror assembly 36 is viewable from the front side 14, the vanity lid 40' can be actuated slidingly from one side to the other by a user so as to uncover the mirror 38 and vanity lights 32 and turn on the vanity lights 32 via a switch as seen in FIGS. 9 and 10. When the vanity lid 40' is slid from the covered position to the uncovered position, the light shield 46 goes from the uncovered position to the covered position on the rear side 12 of visor 10.

The sliding vanity lid 40' has a reflective inside surface 42 that faces light source 24 when in the covered or closed position. The reflective surface 42 reflects light in the direction of the dome light 20 when the dome light is turned on so as to provide for enhanced illumination as compared to the illumination achieved with the vanity lighting, according to one embodiment. Accordingly, with the vanity lid 40' in the covered position as shown in FIG. 8, dome light 20 may be effected, and with the vanity lid 40' in the uncovered position, such as shown in FIG. 10, light shield 46 covers the rear side of the assembly 36 and visor 10 and vanity lighting 32 is effected.

Figure 11:
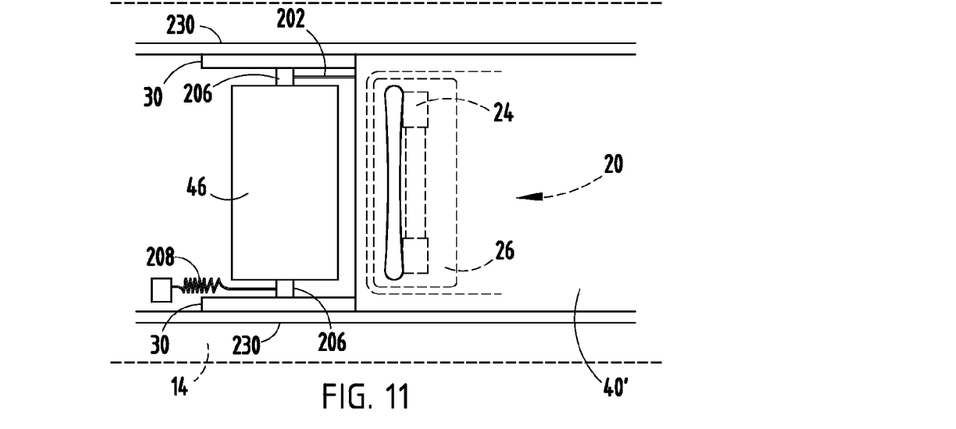
FIG. 11 is a schematic rear view of the shield and slide assembly employed with the sliding vanity lid, according to one embodiment.

Referring to FIG. 11, movement of the light shield 46 in connection with movement of the sliding vanity lid 40' is illustrated, according to one embodiment. In this embodiment, the light shield 46 has a pair of connecting arms 206 which are cooperatively engaged with a track 30 similar to that described in connection with FIGS. 5A and 6A. A cable 202 or other flexible link connects one of arms 206 to the sliding vanity lid 40' such that sliding movement of the vanity lid 40' towards the open position pulls the light shield 46 from the uncovered position to a covered position which covers the optical lens 26 and light source 24 on the rear side of visor 10. A spring 208 is connected between a fixed structure of the visor and an arm 206 of light shield 46 to pull the light shield 46 in the opposite direction from the covered position to the uncovered position when the vanity lid 40' is moved from the uncovered position to the covered position. Accordingly, movement of the vanity lid 40' causes movement of the light shield 46 such that the light shield 46 covers the light source 24 on the rear side of the visor 10 when the vanity light is used and uncovers the light source 24 on the rear side when the vanity light is not used such that the dome lighting may be effected.

Figure 12:
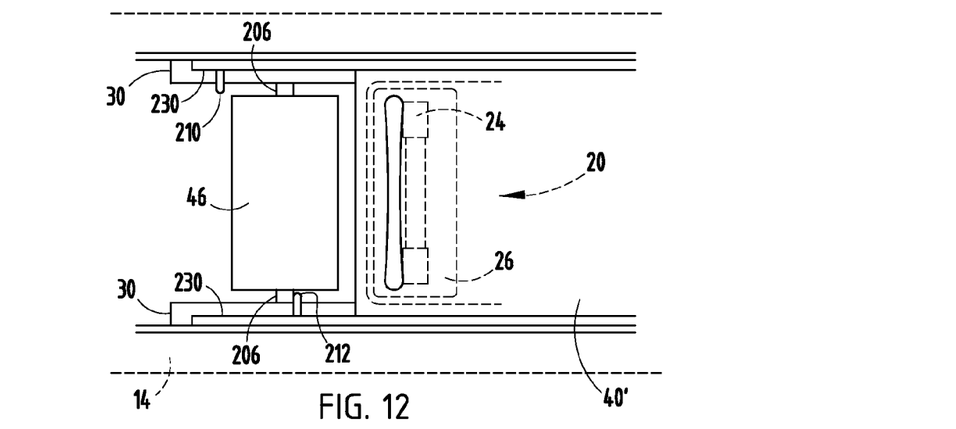
FIG. 12 is a schematic rear view of the shield and slide assembly employed with the sliding vanity lid in the closed position, according to a second embodiment.
Figure 13:
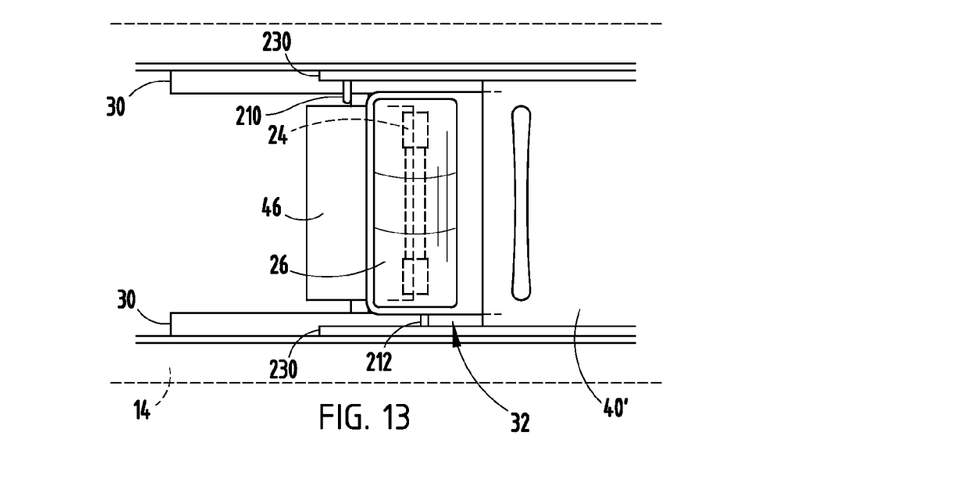
FIG. 13 is a schematic rear view of the shield and slide assembly of FIG. 12 with the vanity lid in the open position.

Referring to FIGS. 12 and 13, the sliding vanity lid embodiment is shown with a light shield actuator, according to another embodiment. In this embodiment, the light shield 46 has a pair of arms 206 on opposite ends disposed within a track 30, and the vanity lid 40' is connected to a pair of rails 230 that slide within track 30. The rails 230 have actuation pins 210 and 212 for engaging the arms 106 of light shield 46. Sliding movement of the vanity lid 40' from the covered position shown in FIG. 12 to the uncovered position shown in FIG. 13 causes one of the pins 210 to engage one of the arms 106 to pull the light shield 46 in the same direction as the vanity lid 46 from the uncovered shield position to a covered shield position which covers optical lens 26 and light source 24 on the rear side of the visor 10. Movement of the sliding vanity lid 40' in the opposite direction from the uncovered position shown in FIG. 13 to the covered position shown in FIG. 12 causes the other pin 212 to engage the other arm 106 of light shield 46 to push the light shield 46 from the covered shield position shown in FIG. 13 to the uncovered shield position shown in FIG. 12. It should be appreciated that other actuation mechanisms may be employed which couple the movement of the vanity lid 40' to the light shield 46 so as to cause the light shield 46 to be in the covered position when the vanity light is configured for use and in the uncovered position when the dome lighting is configured for use.

Figure 14:
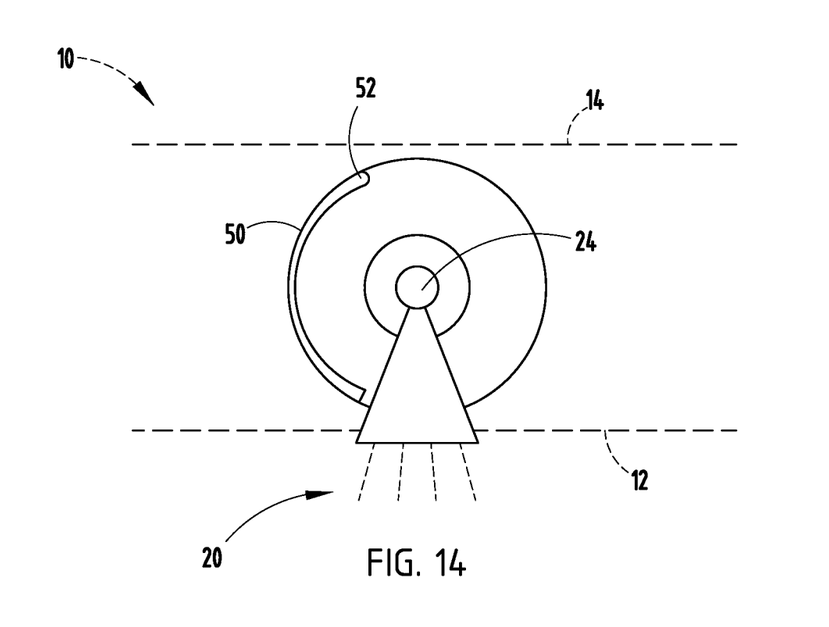
FIG. 14 is a schematic cross-sectional view of a portion of a visor and lighting assembly having a pivoting shield in the stowed position, according to a third embodiment.
Figure 15:
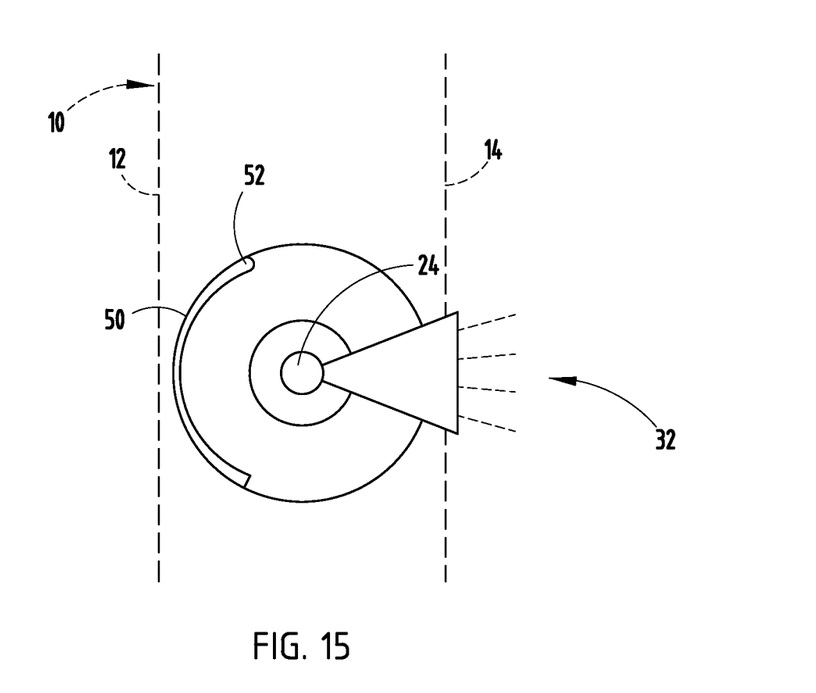
FIG. 15 is a schematic cross-sectional view of the visor shown in FIG. 14 with the visor in the vanity use position.

Referring to FIGS. 14 and 15, a vehicle sun visor 10 is illustrated having a pivoting light shield 50 provided in the visor body, according to a third embodiment. In this embodiment, a curved light shield 50 shown having a generally C-shaped cross section is pivotally mounted inside of the visor body at pivot location 52 such that the light shield 50 is able to pivot when the visor body is rotated between the horizontal stowed position as seen in FIG. 14 and the vertical use position as shown in FIG. 15. As seen in FIG. 14, the light shield 50 is supported about pivot location 52 and extends vertically downward due to gravity such that it generally does not block or shield light in this orientation while the light device assembly is employed as the dome lighting 20. When the visor body is rotated from the stowed position to the downward use position as seen in FIG. 15, the visor 10 is in position for use as the vanity light 32 such that light is emitted from the front side 14 of the visor 10 when the vanity lid is open. During movement to this position, the light shield 50 pivots about pivot location 52 to remain vertical so that it blocks light from penetrating the rear side 12 of the visor body such that light is not emitted from the rear side 32 while the vanity lighting 12 is provided. Thus, the pivoting light shield 50 effectively prevents light from being illuminated rearward of the visor 10 and forward of the vehicle when the vanity light 32 is in use.

Figure 16:
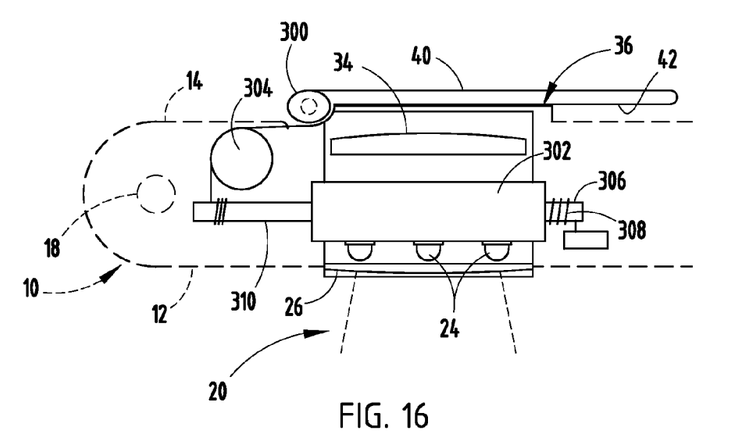
FIG. 16 is a schematic illustration of a visor having a rotating light assembly with the visor in the stowed position, according to a fourth embodiment.
Figure 17:
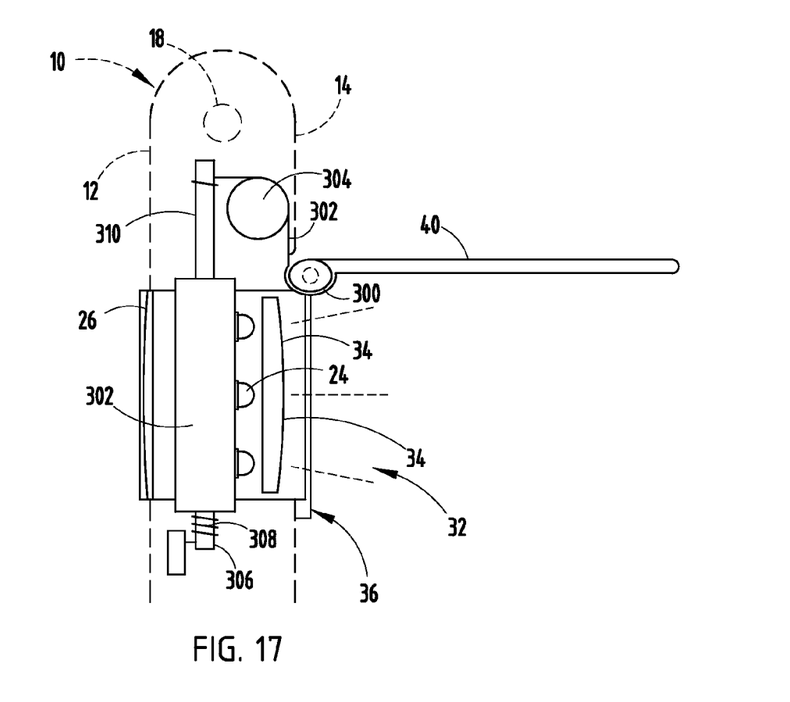
FIG. 17 is a schematic illustration of the visor shown in FIG. 16 with the vanity lid open and the visor in the vanity use position.

Referring to FIGS. 16 and 17, a vehicle sun visor 10 is shown having a vanity and lighting assembly 36 including a lighting device assembly having one or more light sources mounted onto a supporting circuit board 302 that rotates between first and second positions via a rotating mechanism, according to a fourth embodiment. In this embodiment, the rotating mechanism rotates the lighting device assembly between a first position which aligns the one or more light sources 24 with one side of the visor body to serve as a vanity light for the vanity mirror and a second position which aligns the one or more light sources 24 with a second side of the visor body to serve as a dome light. This is achieved by rotating the lighting device assembly by about one hundred eighty degrees (180°) between alignment with the first side 14 and alignment with the second side 12 of the visor body.

In this embodiment, the one or more light sources include a plurality of LEDs 24, shown as three LEDs, in one example.

The LEDs 24 are mounted onto a surface of the circuit board 302. The circuit board 302 may include a printed circuit board (PCB) with electrical circuitry as should be evident to those skilled in the art. Attached to one end of the circuit board is a rod 310 which, in turn, is connected to a cable 302 or other flexible link. Cable 302 passes over a roller 304 which, in turn, engages a cam surface 300 of the vanity lid 40. Rod 310 may extend through the circuit board 302 and extend out the opposite end and is shown engaged to a bias spring 302 which biases the circuit board 302 and LEDs 24 into the position shown in FIG. 16.

When the vanity lid 40 is rotated from the covered position shown in FIG. 16 to the uncovered position as shown in FIG. 17, cable 302 passes over cam surface 300 and roller 304 which causes rod 310 and the circuit board 302 and LEDs 24 to rotate one hundred eighty degrees (180°) such that the LEDs 24 move from the alignment with the second side 12 shown in FIG. 16 to alignment with the first side 14 shown in FIG. 17. In this uncovered vanity lid position, the LEDs 24 illuminate light from the first side 14 of the visor 10 to serve as the vanity light 32. When the vanity lid 40 is closed to the covered position as shown in FIG. 16, bias spring 308 causes the circuit board 302 and LEDs 24 to rotate one hundred eighty degrees (180°) into alignment with the second side 12 of visor 10. The vanity lid 40 has an inner reflective surface 42 for reflecting light in the path of the dome light when in the closed position. Accordingly, in this embodiment, rotation of the visor lid 40 causes rotating movement of the light source 24 between the dome light orientation of FIG. 16 and the vanity lighting orientation of FIG. 17.

Figure 18:
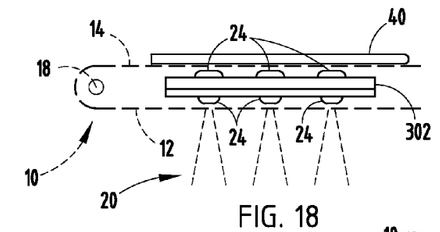
FIG. 18 is a schematic illustration of a visor having fixed lighting devices on opposite sides, according to a fifth embodiment.
Figure 19:
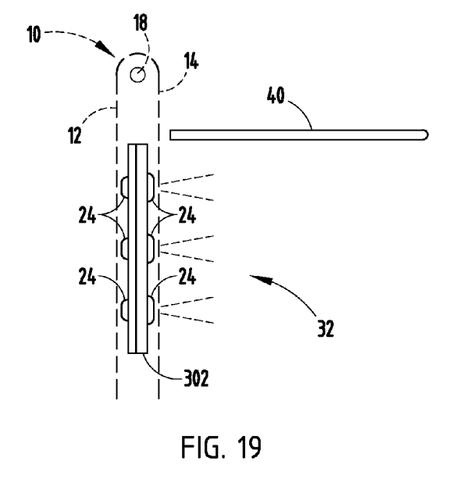
FIG. 19 is a schematic illustration of the visor shown in FIG. 18 with the visor and vanity lid in the vanity use position.

Referring to FIGS. 18 and 19, a visor 10 is shown employing light sources mounted onto a circuit board 302 which is fixed in the visor 10, according to a fifth embodiment. In this embodiment, three light sources, shown as LEDs 24, are mounted onto the top surface of circuit board 302. Three additional light sources, shown as LEDs 24, are mounted onto the bottom surface of circuit board 302. It should be appreciated that circuit board 302 may include one or multiple circuit boards each having electrical circuitry and terminals coupled to light sources on opposite sides thereof. In this embodiment, the light sources 24 on the second side 12 of visor 10 are employed for dome lighting, such that only the second side mounted light sources are activated when the dome light is intended to be operated. When the visor 10 is in a downward use position and the vanity lid 40 is open as shown in FIG. 19, the light sources provided on the first side 14 are turned on to provide vanity lighting, while the light sources on the opposite side are turned off.

Figure 21:
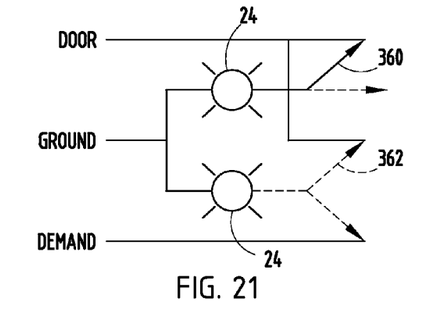
FIG. 21 is a circuit diagram illustrating a circuit for turning the dome lamp and vanity lamp on, according to another embodiment.

The visor 10 shown in FIGS. 18 and 19 may employ switching circuitry shown in FIG. 21, according to one example. In this example, the opening of a vehicle door may cause a switch 360 to close with a light source on the dome light or second side 12 of visor 10 such that the dome light is activated on. In contrast, a demand from the vanity lid 40 moving to the uncovered position may close a switch 362 allowing power to be supplied to ground through the light source on the opposite or first side of the visor 10 so as to operate as a vanity light. It should further be appreciated that the dome light may be activated via a user control switch when interior lighting is desired.

Figure 20:
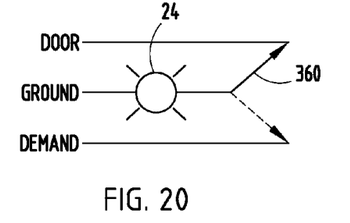
FIG. 20 is a circuit diagram illustrating a circuit for turning the dome lamp and vanity light on, according to one embodiment.

Various embodiments of the visor 10 shown and described herein may employ switching circuitry as shown in either of FIG. 20 or FIG. 21. In FIG. 20, a switch 360 is closed when a vehicle door is opened so as to allow electrical power to flow to ground through one or more light sources 24. Additionally, the switch 360 is close between power and ground when a demand switch, such as a vanity lid 40 opening, is activated.

It should further be appreciated that user control switches may be employed to provide power through a light source to ground to activate one or more light sources 24 based on a user control switch when desired.

Figure 23:
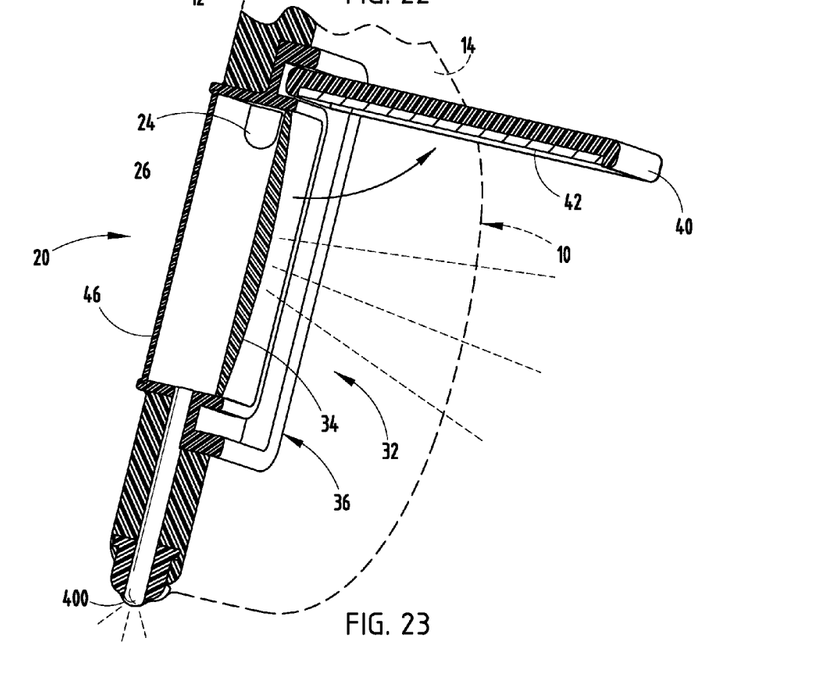
FIG. 23 is a cross-sectional view taken through line XIX-XIX of FIG. 22 further illustrating the lighting assembly.

Referring to FIGS. 22 and 23, a visor 10 and vanity and lighting assembly 36 is illustrated according to a sixth embodiment. In this embodiment, the vehicle sun visor 10 has a visor body having a first side 14 and a second side 12 and a peripheral edge side 16 extending between the first side and the second side. A vanity mirror assembly having a mirror 38, lights 32 and lid 40 is located on the first side 14 of the visor body. A lighting device assembly comprising a light source 24 is located on the visor body and configured to provide a vanity light for the vanity mirror 38 on the front side 14 and a dome light is provided on the peripheral edge side 16. The light source 24 directs light towards a lens 400 located near or on the peripheral edge side 16 and aligned with light source 24. It should be appreciated that the light source 24 directs light towards lens 34 to provide vanity lighting 32 and at the same time directs light towards lens 400 to provide peripheral edge lighting which may also serve as dome lighting including a reading light. In this embodiment, a fixed cover 46 covers the second side of the light to prevent light from passing out the second side 12 of visor 10. When the vanity lid 40 is closed to the covered position, and the light source 24 is turned on, substantially all light passes to lens 400 at the peripheral side edge 16 such that the light illumination may serve as a dome light at the peripheral edge side 16. In this embodiment, the lighting device 24 includes one or more LEDs.

Figure 24:
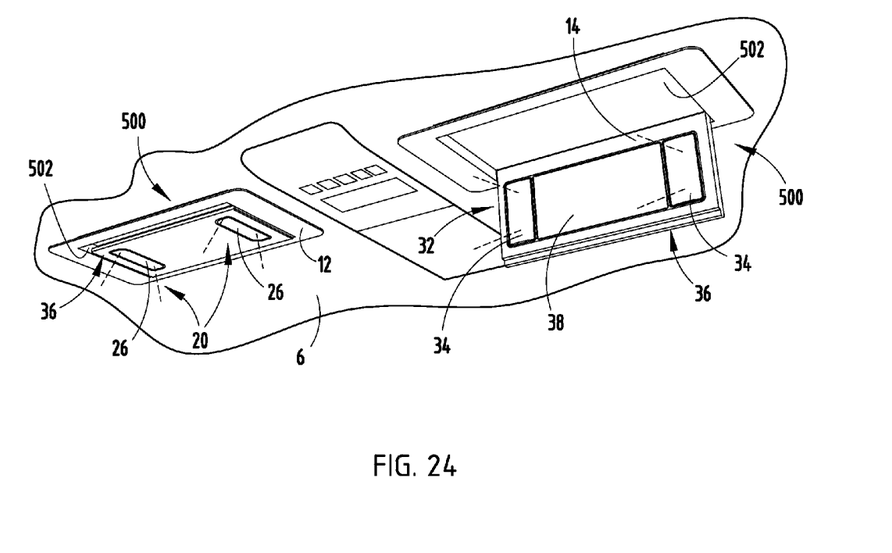
FIG. 24 is a perspective view of a pair of vanity and light assemblies located in the headliner for use by rear seat passengers of a vehicle, according to a seventh embodiment.

Referring to FIG. 24, the vanity and lighting assembly 36 is illustrated as a standalone assembly absent the visor for use as a rear seat vanity, according to a seventh embodiment. In this embodiment, first and second rear seat vanity and lighting assemblies 36 are shown mounted or installed in the headliner 6 below the roof of the vehicle 2 in a region generally forward of and above the rear passenger seating of the vehicle 2. The vanity and lighting assembly 36 on the left is shown stowed in a closed position rotated flush within a recessed area 52 of headliner 6 and having dome lighting 20 provided at lenses 26. The vanity and light assembly 36 shown on the right side illustrates the assembly 36 in a deployed vertical position for use as a vanity and vanity light. It should be appreciated that the vanity and lighting assembly 36 rotates about a hinge between the upward deployed position in recessed area 502 of headliner 6 shown on the left side and the downward vertical position shown on the right side. The vanity and lighting assembly 36 provides vanity lighting 32 output via an optics lens 34 which may be turned on when the assembly is rotated to the downward use position. The assembly 36 may or may not include a vanity cover for covering the mirror 38 and optics lens 34. While the vanity and lighting assembly 36 is shown in FIG. 24 for use in the headliner 6 and a region generally forward of and above rear passengers of the vehicle, it should be appreciated that the vanity and lighting assembly 36 may be located elsewhere in the vehicle. It should be appreciated that the vanity and light assembly 36 may be configured according to any of the embodiments shown and described herein above and in connection with FIGS. 1-23 for use as a vanity and lighting assembly separate from a visor. It should further be appreciated that the vanity and lighting assembly 36 may be used in connection with other supporting bodies, according to various other embodiments.

Accordingly, it should be appreciated that the visor 10 and vanity and lighting assembly 36 advantageously provides for dome lighting and vanity lighting in a vanity and lighting assembly, which is particularly useful in a vehicle sun visor.

The visor 10 advantageously employs electrical lighting devices in the visor and helps to minimize wiring and lighting devices elsewhere in the vehicle, such that vehicle assembly may be simplified. While a pair of dome lights and a pair of vanity lights are shown and described herein in various embodiments, it should be appreciated that the dome light and vanity lights may be implemented as one or more lighting devices.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle vanity and lighting assembly comprising:
a body having first and second sides;
a vanity mirror located on the first side of the body;
a lighting device assembly located on the body and configured to provide a vanity light and further configured to provide a dome light; and
a vanity lid comprising a light reflective surface on one side for reflecting light for the dome light when the vanity lid covers the vanity mirror.

2. The assembly as defined in claim 1, wherein the vanity light is provided on the first side of the body and the dome light is provided on the second side of the body which is opposite the first side of the body.

3. The assembly as defined in claim 1, wherein the assembly pivots between a stowed position adjacent to a roof of the vehicle and a downward use position.

4. The assembly as defined in claim 1, wherein the assembly is mounted to a vehicle headliner.

5. The assembly as defined in claim 4, wherein the assembly rotates between an upward position within a recessed area of the headliner and a downward position.

6. The assembly as defined in claim 1, wherein the second side of the body is opposite the first side of the body.

7. A vehicle vanity and lighting assembly comprising:
a body having first and second sides;
a vanity mirror comprising a vanity lid and mirror located on the first side; and
a lighting device assembly configured to provide a vanity light on the first side and a dome light on the second side, wherein the vanity lid comprises a light reflective surface for reflecting light for the dome light when the vanity lid covers the mirror.

8. The assembly as defined in claim 7, wherein the second side of the body is opposite the first side of the body.

9. The assembly as defined in claim 7, wherein the assembly pivots between a stowed position adjacent to a roof of the vehicle and a downward use position.

10. The assembly as defined in claim 7, wherein the assembly is mounted to a vehicle headliner.

11. The assembly as defined in claim 7, wherein the lighting device assembly comprises at least a first light source oriented on the first side to provide a vanity light for the vanity mirror and at least a second light source oriented on the second side to provide a dome light.

12. The assembly as defined in claim 11, wherein the at least first light source comprises a light emitting diode and the at least second light source comprises a light emitting diode.

13. A vehicle vanity and lighting assembly comprising:
a body having opposite first and second sides;
a vanity mirror located on the first side; and
a lighting device located on the body and comprising a first light source oriented on the first side to provide a vanity light for the vanity mirror and a second light source oriented on the second side to provide a dome light, wherein the first and second light sources are located on opposite sides of a circuit board.

14. The assembly as defined in claim 13, wherein the first light source comprises a first plurality of LEDs and the second light source comprises a second plurality of LEDs.

* * * * *